United States Patent
Liu et al.

(10) Patent No.: US 11,084,905 B2
(45) Date of Patent: Aug. 10, 2021

(54) POLYMER WITH ZWITTERIONIC GROUP AND BENZOXAZINE GROUP AND MANUFACTURING METHOD THEREOF

(71) Applicant: NATIONAL TSING HUA UNIVERSITY, Hsinchu (TW)

(72) Inventors: Ying-Ling Liu, Hsinchu (TW); Yi-Jen Han, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 166 days.

(21) Appl. No.: 16/590,546

(22) Filed: Oct. 2, 2019

(65) Prior Publication Data

US 2020/0308347 A1 Oct. 1, 2020

(30) Foreign Application Priority Data

Mar. 29, 2019 (TW) ................. 108111392

(51) Int. Cl.
*C08G 73/06* (2006.01)

(52) U.S. Cl.
CPC .................... *C08G 73/06* (2013.01)

(58) Field of Classification Search
CPC .................... C08G 14/06; C08G 73/06
See application file for complete search history.

(56) References Cited

U.S. PATENT DOCUMENTS 8,309,066 B2 * 11/2012 Taden ................. C08G 73/02
424/70.11

OTHER PUBLICATIONS

Asei William Kawaguchi et al., "Polymerization-Depolymerization System Based on Reversible Addition-Dissociation Reaction of 1,3-Benzoxazine with Thiol", ACS Macro Letters, published on Dec. 10, 2012, vol. 2, issue 1, pp. 1-4, published by American Chemical Society, United States.

D. W. Roberts et al., "Sultone Chemistry," Tetrahedron, available online on Jun. 27, 2001, vol. 43, issue 6, pp. 1027-1062, Tetrahedron Report No. 215, published by Elsevier Ltd., United Kingdom.

Ching Hsuan Lin et al., "Flexible polybenzoxazine thermosets with high glass transition temperatures and low surface free energies", Polymer Chemistry, published on Jan. 30, 2012, vol. 3, issue 4, pp. 935-945, published by the Royal Society of Chemistry, United Kingdom.

Tsutomu Takeichi et al., "Synthesis and thermal cure of high molecular weight polybenzoxazine precursors and the properties of the thermosets", Polymer, published on Nov. 8, 2005, vol. 46, issue 26, pp. 12172-12180, published by Elsevier Ltd., Netherlands.

Yi-Jen Han et al., "Preparation of Cross-Linkable Zwitterionic Polybenzoxazine with Sulfobetaine Groups and Corresponding Zwitterionic Thermosetting Resin for Antifouling Surface Coating", Applied Bio Materials, published on Sep. 16, 2019, vol. 2, issue 9, pp. 3799-3807, published by American Chemical Society, United States.

* cited by examiner

*Primary Examiner* — Christopher M Rodd
(74) *Attorney, Agent, or Firm* — Fay Sharpe LLP

(57) ABSTRACT

A polymer with a zwitterionic group and a benzoxazine group and a manufacturing method for the polymer are disclosed. The manufacturing method includes the step below. A polymer containing the benzoxazine group and a precursor containing a Z functional group are reacted, wherein the Z functional group includes 10 Claims, 8 Drawing Sheets

POLYMER WITH ZWITTERIONIC GROUP AND BENZOXAZINE GROUP AND MANUFACTURING METHOD THEREOF

CROSS-REFERENCE TO RELATED APPLICATION

This application claims priority to Taiwan Application Serial Number 108111392, filed Mar. 29, 2019, which is herein incorporated by reference.

BACKGROUND

Field of Invention

The present invention relates to a polymer with a zwitterionic group and a benzoxazine group and a manufacturing method thereof.

Description of Related Art

Because zwitterionic groups have a high degree of hydrophilicity, the surface of a material having zwitterionic groups can form a hydration layer to exhibit multiple effects, such as anti-adhesion of biomolecules and antifogging, etc. The polymer with a zwitterionic group combines dual properties of polymer(s) and zwitterion(s) and has a considerable potential for applications. However, due to the limitation of the synthesis reaction pathway, the current zwitterionic polymer is mostly obtained by radical polymerization through using a double bond compound with a zwitterionic group as a monomer.

SUMMARY

One objective of the present invention is to provide a novel polymer that contains the zwitterionic group and the benzoxazine group at the same time. Not only does it have the properties, performances, and applications of zwitterionics, but its physical properties and mechanical properties also exhibit the properties of a thermoplastic polymer during processing. In addition, the material can exhibit advantages of a thermoplastic polymer after processing.

A manufacturing method for a polymer with a zwitterionic group and a benzoxazine group is provided. A polymer containing the benzoxazine group and a precursor containing a Z functional group are polymerized, wherein the Z functional group comprises

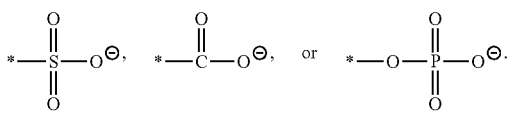

In some embodiments, the polymer containing the benzoxazine group has a structure shown by the following formula (1):

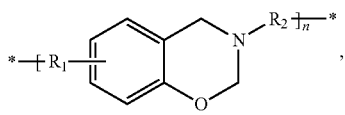

Formula (I)

wherein $R_1$ is an alkylene group, an unsaturated hydrocarbon group, an amine group, an amide group, a benzoxazine group, a siloxane group, a phenolic group, an aryl group, a heteroaromatic group, a heterocyclic group, a carbocyclic group, or a cycloalkane group, $R_2$ is an alkylene group, an unsaturated hydrocarbon group, an amine group, an amide group, a benzoxazine group, a siloxane group, a phenolic group, an aryl group, a heteroaromatic group, a heterocyclic group, a carbocyclic group, or a cycloalkane group, n is an integer.

In some embodiments, the polymer containing the benzoxazine group is

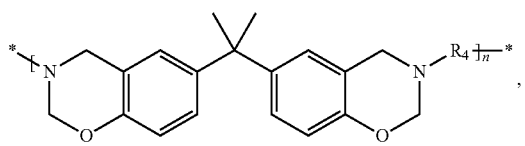

wherein $R_4$ is

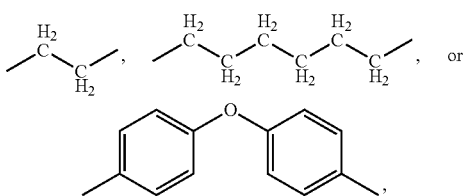

n is an integer.

In some embodiments, the polymerizing is carried out at a temperature ranging from 35° C. to 80° C. under a nitrogen atmosphere.

In some embodiments, the precursor containing the Z functional group comprises

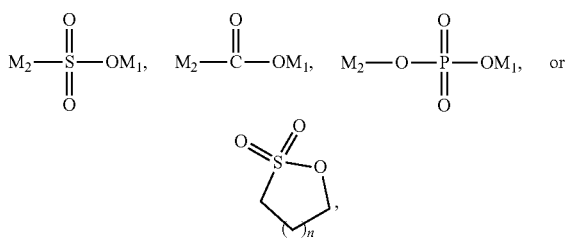

wherein $M_1$ comprises hydrogen, a metal cation, or an ammonium ion, $M_2$ comprises one of hydrocarbon groups having 1 to 10 carbon atoms, and n is one of hydrocarbon groups having 0 to 8 carbon atoms.

In some embodiments, the precursor containing the Z functional group is 1,3-propane sultone.

In some embodiments, the polymerizing comprises the following steps. A ring-opening reaction is performed on the 1,3-propane sultone. The ring-opened 1,3-propane sultone is bonded to a nitrogen atom of the benzoxazine group of the polymer containing the benzoxazine group.

The invention provides a polymer with a zwitterionic group and a benzoxazine group that has a structure shown by the following formula (II):

Formula (II)

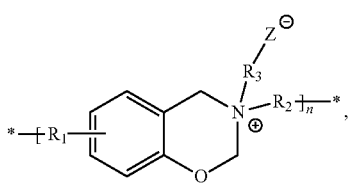

wherein R₁ is an alkylene group, an unsaturated hydrocarbon group, an amine group, an amide group, a benzoxazine group, a siloxane group, a phenolic group, an aryl group, a heteroaromatic group, a heterocyclic group, a carbocyclic group, or a cycloalkane group, R₂ is an alkylene group, an unsaturated hydrocarbon group, an amine group, an amide group, a benzoxazine group, a siloxane group, a phenolic group, an aryl group, a heteroaromatic group, a heterocyclic group, a carbocyclic group, or a cycloalkane group, R₃ is an alkylene group, art alkenyl group, a cycloalkane group, an aryl group, or a heterocyclic group, Z⁻ comprises

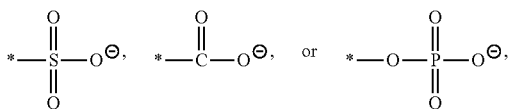

n is an integer.

In some embodiments, the polymer with the zwitterionic group and the benzoxazine group has a structure shown by the following formula (III):

Formula (III)

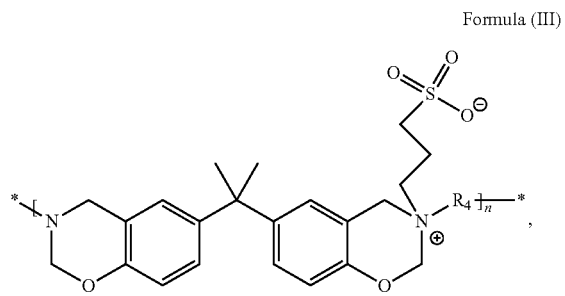

wherein R₄ is

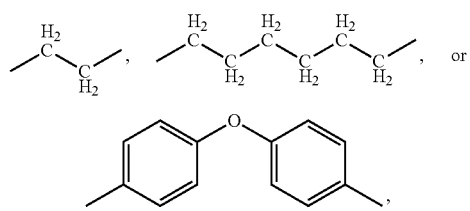

n is an integer.

In some embodiments, the polymer with the zwitterionic group and the benzoxazine group has a structure shown by the following formula (IV):

Formula (IV)

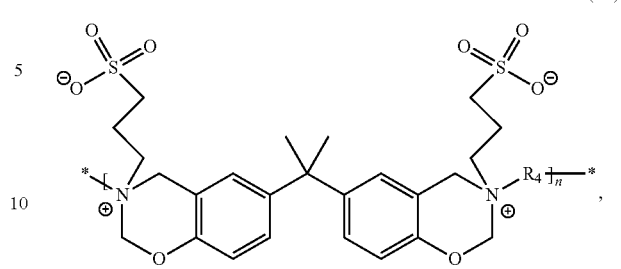

wherein R₄ is

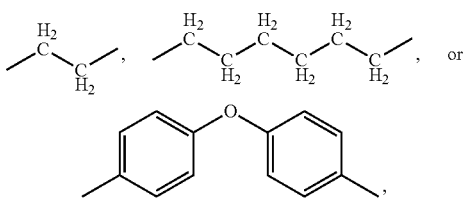

n is an integer.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Figure 1A:
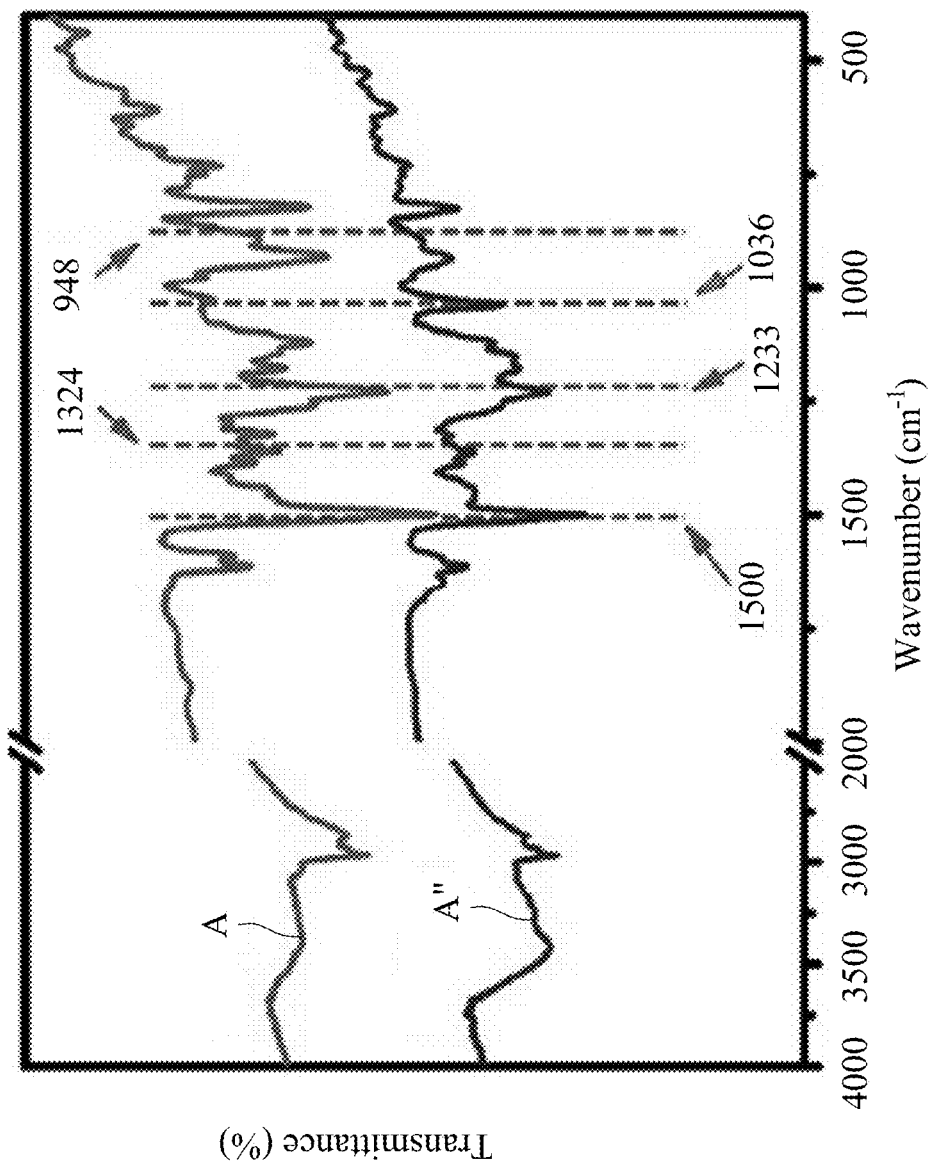
FIG. 1A, FIG. 1B, and FIG. 1C depict Fourier-transform infrared spectra of polymers with a zwitterionic group and a benzoxazine group according to various embodiments of this invention.

The following disclosure provides many different embodiments, or examples, for implementing different features of the invention. Specific examples of components and arrangements are described below to simplify the present disclosure. These are, of course, merely examples and are not intended to be limiting.

One aspect of the present invention is to provide a manufacturing method for a polymer with a zwitterionic group and a benzoxazine group. The manufacturing method comprises the steps as follows. A polymer containing the benzoxazine group and a precursor containing a Z functional group are polymerized, wherein the Z functional group comprises

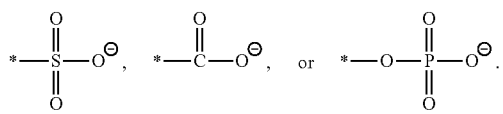

In various embodiments, the polymer containing the benzoxazine group has a structure shown by the following formula (I):

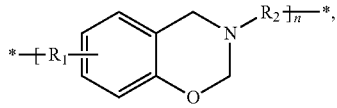
Formula (I)

wherein $R_1$ is an alkylene group, an unsaturated hydrocarbon group, an amine group, an amide group, a benzoxazine group, a siloxane group, a phenolic group, an aryl group, a heteroaromatic group, a heterocyclic group, a carbocyclic group, or a cycloalkane group, $R_2$ is an alkylene group, an unsaturated hydrocarbon group, an amine group, an amide group, a benzoxazine group, a siloxane group, a phenolic group, an aryl group, a heteroaromatic group, a heterocyclic group, a carbocyclic group, or a cycloalkane group, n is an integer.

In various embodiments, the polymer containing the benzoxazine group may be

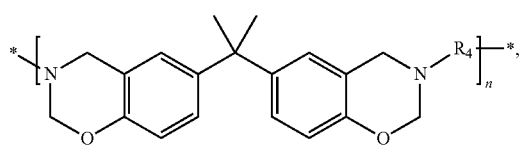

wherein $R_4$ is

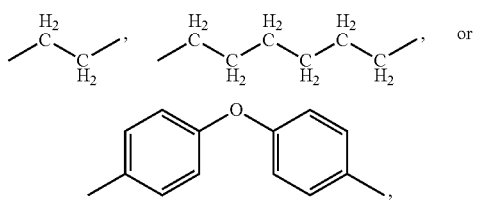

n is an integer. In greater detail, when $R_4$ is

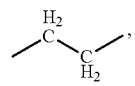

the above polymer containing the benzoxazine group may be referred to as PBz-ED. When $R_4$ is

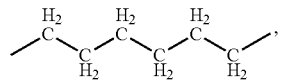

the above polymer containing the benzoxazine group may be referred to as PBz-DAH. When $R_4$ is

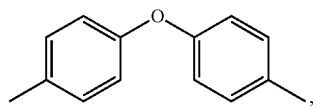

the above polymer containing the benzoxazine group may be referred to as PBz-ODA.

In various embodiments, the precursor containing the Z functional group comprises

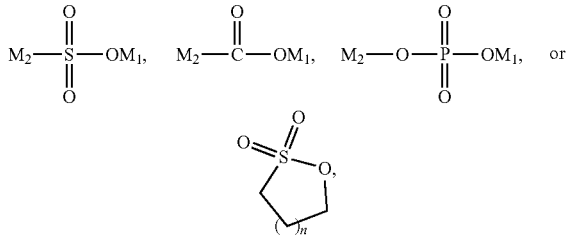

wherein $M_1$ comprises hydrogen, a metal cation, or an ammonium ion, $M_2$ comprises one of hydrocarbon groups having 1 to 10 carbon atoms, and n is one of hydrocarbon groups having 0 to 8 carbon atoms.

In one embodiment, the precursor containing the Z functional group is 1,3-propane sultone.

In one embodiment, the polymerizing comprises performing a ring-opening reaction on the 1,3-propane sultone, and bonding the ring-opened 1,3-propane sultone to a nitrogen (N) atom of the benzoxazine group of the polymer containing the benzoxazine group.

In various embodiments, the above polymerizing is carried out at a temperature ranging from 35° C. to 80° C. under a nitrogen atmosphere. For example, the temperature may be 40° C., 45° C., 50° C., 55° C., 60° C., 65° C., 70° C., or 75° C. For example, when the polymer containing the benzoxazine group is PBz-ED or PBz-DAH, the operating temperature of the polymerizing is about 35° C. When the polymer containing the benzoxazine group is PBz-ODA, the operating temperature of the polymerizing is about 80° C.

In one practical operation, approximately 3.5 grams (about 0.009 mole) of PBz-ED white powder and approximately 2.57 grams (about 0.021 mole) of liquid 1,3-propane sultone were first poured into a two-neck round-bottom flask containing 40 mL of ACS reagent grade tetrahydrofuran (THF), and a stir bar was added to stir. After the above mixture was dissolved, it was placed in an oil bath at 30° C. and heated under nitrogen gas to react for 24 hours. An excess amount of solution of methanol and water (the ratio of the methanol volume V1 to the water volume V2 (V1/V2) is 9/1) was dripped into the mixed solution after the reaction to allow the polymer precipitate with the zwitterionic group and the benzoxazine group to be precipitated. After that, the above precipitate was separated by utilizing suction filtration, and then dried in a vacuum system for 1 day. The polymer with the zwitterionic group and the benzoxazine group according to the present invention that has the chemical formula

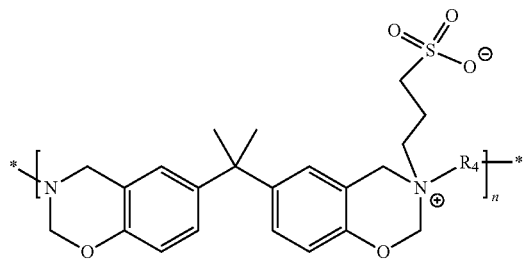

can be obtained, wherein $R_4$ is

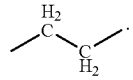

In the present experiment, the yield of the polymer with the zwitterionic group and the benzoxazine group is about 57.27 wt %.

Another aspect of the present invention is to provide a polymer with a zwitterionic group and a benzoxazine group, which has a structure shown by the following formula (II):

Formula (II)

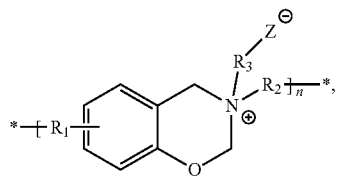

wherein $R_1$ is an alkylene group, an unsaturated hydrocarbon group, an amine group, an amide group, a benzoxazine group, a siloxane group, a phenolic group, an aryl group, a heteroaromatic group, a heterocyclic group, a carbocyclic group, or a cycloalkane group, $R_2$ is an alkylene group, an unsaturated hydrocarbon group, an amine group, an amide group, a benzoxazine group, a siloxane group, a phenolic group, an aryl group, a heteroaromatic group, a heterocyclic group, a carbocyclic group, or a cycloalkane group, $R_3$ is an alkylene group, an alkenyl group, a cycloalkane group, an aryl group, or a heterocyclic group, $Z^-$ comprises

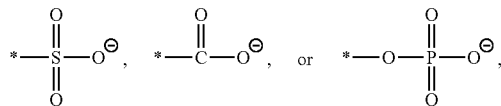

n is an integer.

In various examples, the polymer with the zwitterionic group and the benzoxazine group may have a structure shown by the following formula (III):

Formula (III)

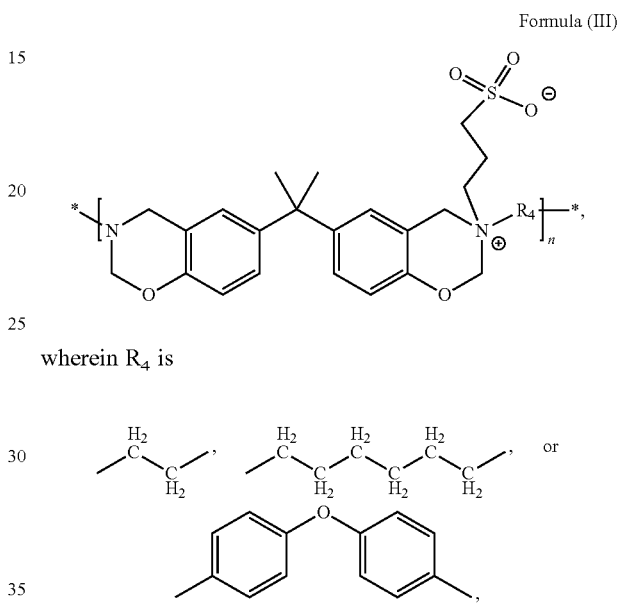

wherein $R_4$ is

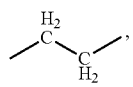

n is an integer. In greater detail, when $R_4$ is

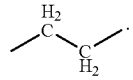

the above polymer with the zwitterionic group and the benzoxazine group may be referred to as PBz-ED-SB (hereinafter referred to as "Example 1"). When $R_4$ is

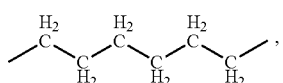

the above polymer with the zwitterionic group and the benzoxazine group may be referred to as PBz-DAH-SB (hereinafter referred to as "Example 2"). When $R_4$ is

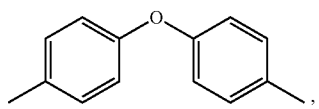

the above polymer with the zwitterionic group and the benzoxazine group may be referred to as PBz-ODA-SB (hereinafter referred to as "Example 3").

Figure 1B:
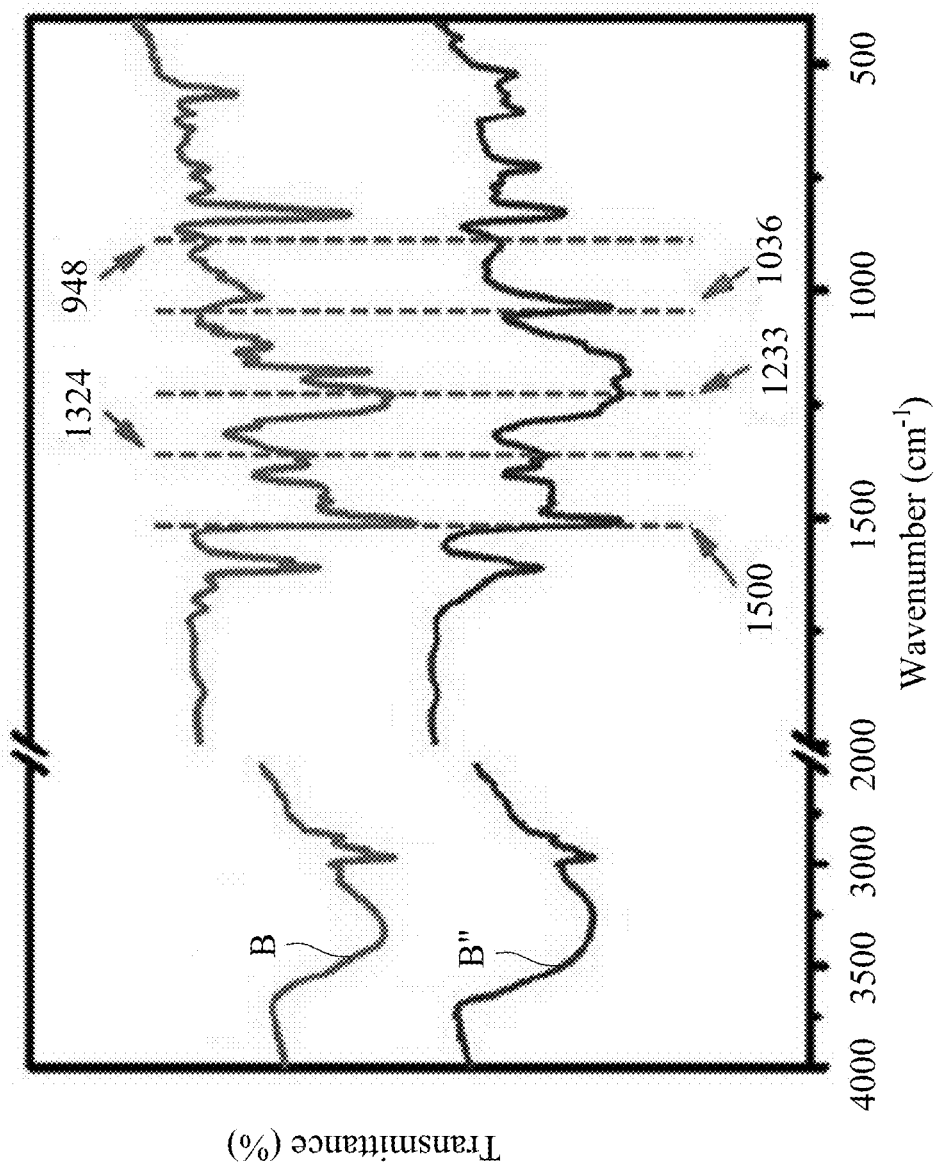
Figure 1C:
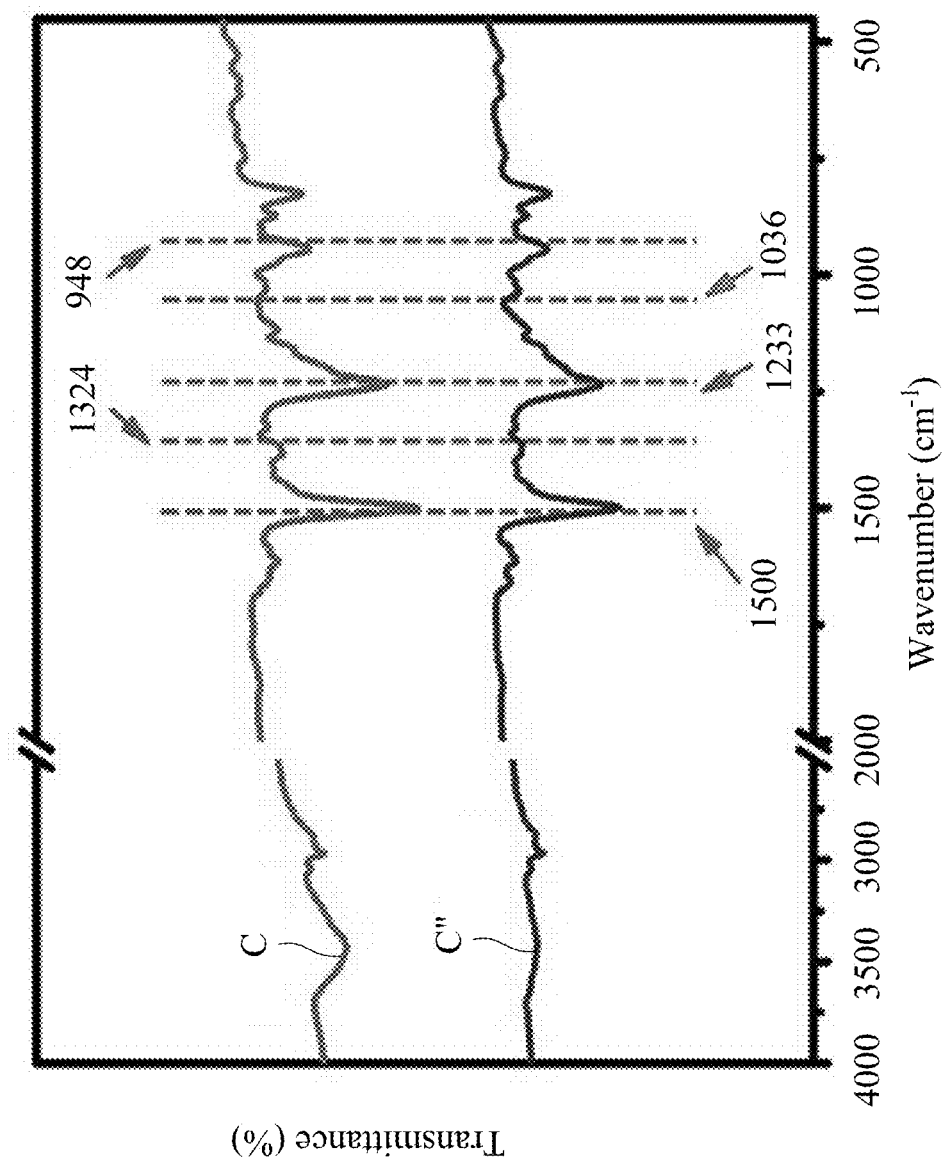

FIG. 1A, FIG. 1B, and FIG. 1C depict Fourier-transform infrared (FTIR) spectra of the polymers with the zwitterionic group and the benzoxazine group respectively according to Example 1, Example 2, and Example 3 of this invention. It is noted that curve A is the Fourier-transform infrared spectrum of PBz-ED and curve A" is the Fourier-transform infrared spectrum of Example 1 (PBz-ED-SB) in FIG. 1A. Curve B is the Fourier-transform infrared spectrum of PBz-DAH and curve B" is the Fourier-transform infrared spectrum of Example 2 (PBz-DAH-SB) in FIG. 1B. Curve C is the Fourier-transform infrared spectrum of PBz-ODA and curve C" is the Fourier-transform infrared spectrum of Example 3 (PBz-ODA-SB) in FIG. 1C. Generally speaking, a specific chemical structure has specific characteristic absorption peak(s) in the Fourier-transform infrared spectrum, as shown in Table 1 as follows.

TABLE 1

| Chemical Structure | Benzene Ring | Oxazine Ring | —C—O—C— in Benzoxazine Ring |
|---|---|---|---|
| Characteristic Absorption Peak (cm$^{-1}$) | 1500 | 1324 and 948 | 1233 |

It can be observed from FIG. 1A, FIG. 1B, and FIG. 1C that the curves A", B", and C" all have the characteristic absorption peaks as shown in Table 1. It is thus illustrated that Example 1, Example 2, and Example 3 of the present invention all have the structure of the benzoxazine group.

In addition, an obvious characteristic absorption peak at 1036 cm$^{-1}$ is also observed when analyzing the grafted product of the sulfobetaine segment, which is the characteristic absorption peak of —SO$_3^-$. Therefore, the successful synthesis by grafting the sulfobetaine segment onto the polybenzoxazine segment can be preliminarily illustrated.

Figure 2:
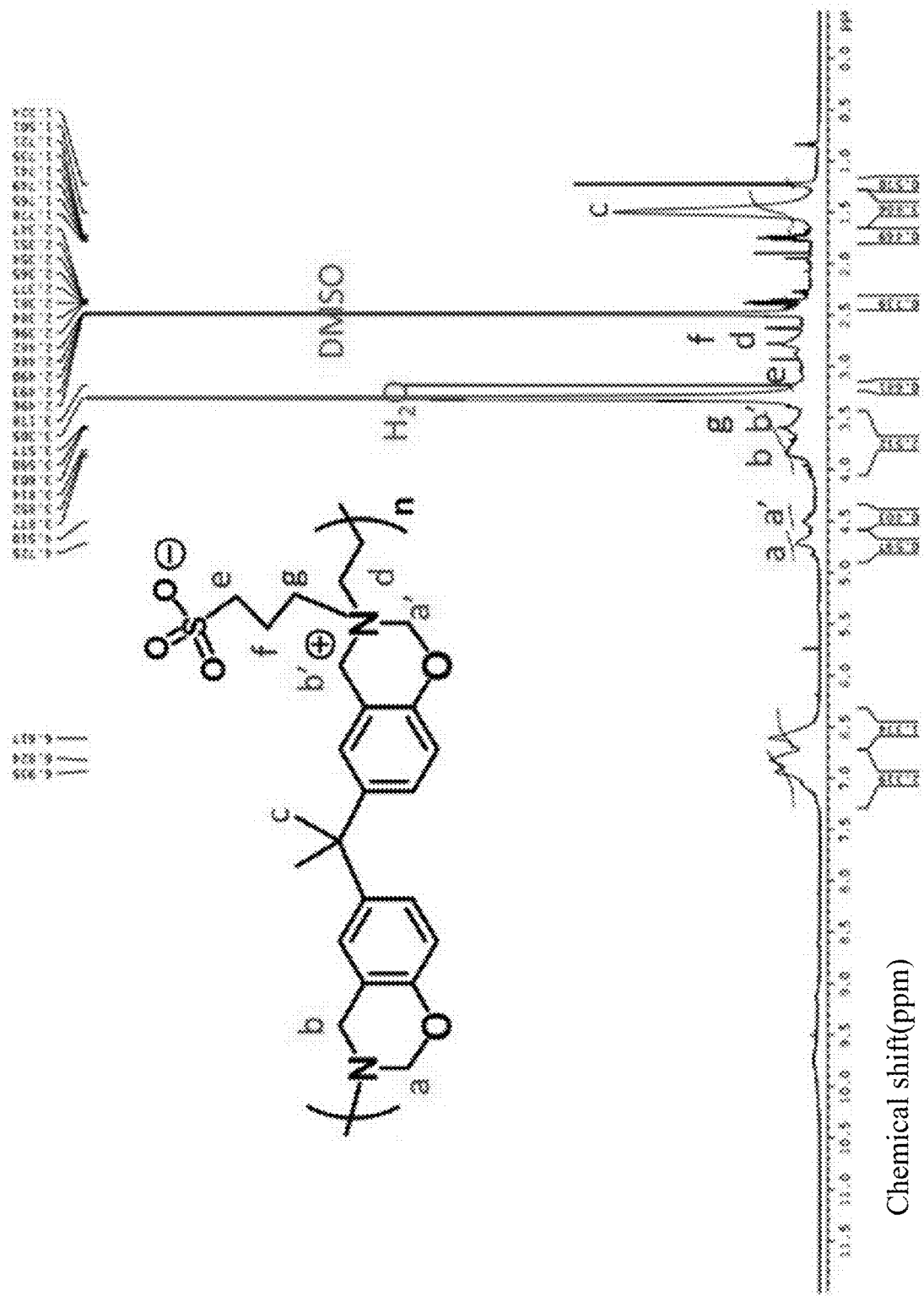
FIG. 2 depicts a ¹H nuclear magnetic resonance spectrum of a polymer with a zwitterionic group and a benzoxazine group according to one embodiment of this invention.

FIG. 2 depicts a $^1$H nuclear magnetic resonance (NMR) spectrum of the polymer with the zwitterionic group and the benzoxazine group according to Example 1 (PBz-ED-SB) of this invention. As can be found from the identification result of the $^1$H NMR spectrum shown in FIG. 2, chemical shifts of Ph-O—CH—N (δ=4.74 ppm) and Ph-CH—N (δ=3.86 ppm) change after grafting the sulfobetaine segment, which are δ=4.51 ppm and δ=3.59 ppm, respectively. After utilizing the above chemical shifts to integrate areas, the values are 0.597 and 0.403, respectively. Based on this, the substitution ratio can be calculated to be about 40.3%, and the successful synthesis of the structure of Example 1 (PBz-ED-SB) according to the present invention can thus be illustrated.

Experimental Example 1: Thermal Analysis

Thermal analyses are performed on Example 1 (PBz-ED-SB) and Example 2 (PBz-DAH-SB) of the present invention. In greater detail, differential scanning calorimetry (DSC) is utilized to perform thermal analyses. It can be found from the analysis results that Example 1 and Example 2 have more obvious exothermic peaks respectively at 178° C. and 145° C. as compared with PBz-ED and PBz-DAH which do not graft zwitterions onto the main chain polymer segments. It can be assumed the reason is that a quaternary ammonium salt structure is formed after zwitterions of the sulfobetaine are grafted onto the main chain polymer segment, which in turn decreases the electron density of the benzoxazine ring. As a result, the Ting-opening temperature is reduced.

Experimental Example 2: Pyrolysis Reaction

Pyrolysis reactions of the polymers with the zwitterionic group and the benzoxazine group according to Example 1 and Example 2 of the present invention was performed under nitrogen atmospheres and air atmospheres. The initial reaction temperatures and carbon residue amounts are listed in Table 2 as follows. In greater detail, carbon residue analyses are performed by using thermogravimetric analysis (TGA) in this experiment.

TABLE 2

| | | Example 1 (PBz-ED-SB) | Example 2 (PBz-DAH-SB) |
|---|---|---|---|
| Nitrogen Atmosphere | Initial Reaction Temperature (° C.) | 205 | 231 |
| | Carbon Residue Amount (%) | 15.6 | 21.4 |
| Air Atmosphere | Initial Reaction Temperature (° C.) | 211 | 232 |
| | Carbon Residue Amount (%) | 0 | 0 |

As can be seen from the above Table 2, the pyrolysis reactions of the polymers with the zwitterionic group and the benzoxazine group according to Example 1 and Example 2 were performed under nitrogen atmospheres and air atmospheres. The initial reaction temperatures of their pyrolysis reactions were from 205° C. to 232° C. It was thus illustrated that the polymers form crosslinked structures because of their benzoxazine groups and the thermal ring-opening reactions at high temperature. As a result, the polymers have good thermal stability.

Experimental Example 3: Contact Angle Test

Contact angle tests were performed on surfaces of the polymers with the zwitterionic group and the benzoxazine group according to Example 1 and Example 2 of the present invention. Generally speaking, surface contact angles of the PBz-ED and PBz-DAH that do not graft zwitterions onto the main chain polymer segments were 91.7 degrees and 84.6 degrees, respectively. However, it can be found from the experimental results that surface contact angles of Example 1 and Example 2 were reduced to 65.6 degrees and 76.9 degrees, respectively. This proves that the reactions of grafting the zwitterionic groups of the hydrophilic sulfobetaine are very successful in Example 1 and Example 2 of the present invention.

In another embodiment, the polymer with the zwitterionic group and the benzoxazine group has a structure shown by the following formula (IV):

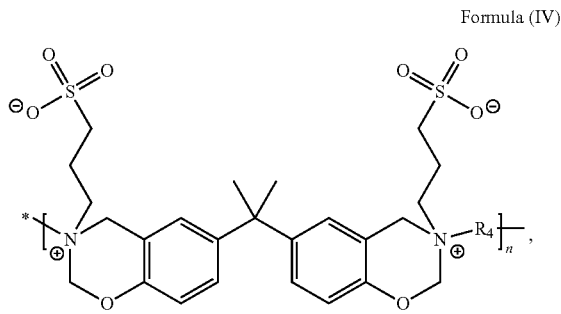

Formula (IV)

wherein $R_4$ is

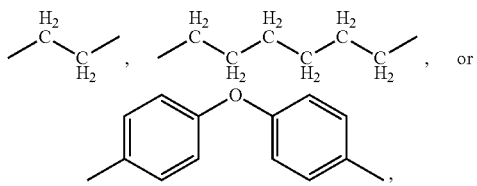

n is an integer.

Figure 3:
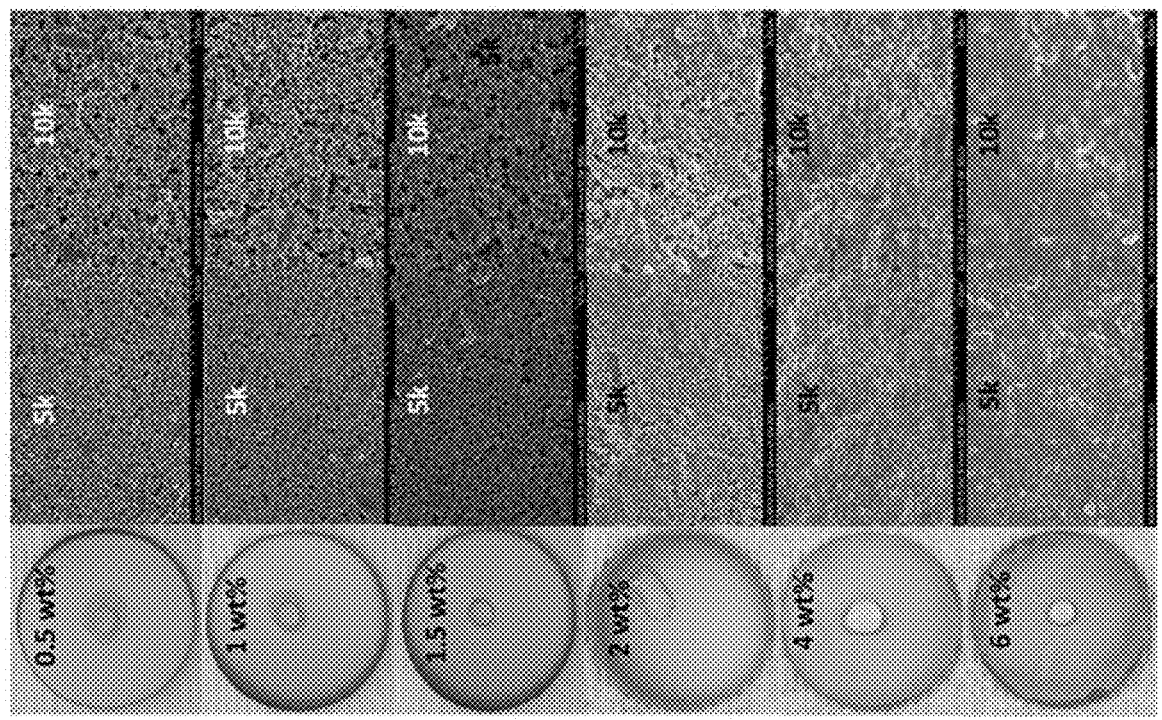
FIG. 3 shows scanning electron microscope images of surfaces of ceramic membranes coated with solutions of a polymer with a zwitterionic group and a benzoxazine group having different concentrations according to one application example of this invention.

Application Example 1: Application of Zwitterionic Polymer PBz-ED-SB in Protein Filtration FIG. 3 shows scanning electron microscope (SEM) images of surfaces of ceramic membranes coated with solutions of Example 1 (PBz-ED-SB) having different concentrations according to one application example of this invention. As can be seen from the results of FIG. 3, pores on the surfaces of the ceramic membranes are all blocked by the PBz-ED-SB polymer at a high concentration (2 wt %-6 wt %). This result will make it difficult for water droplets to pass through the ceramic membrane to further affect the application range of the ceramic membrane on filtration. When the concentration of the solution of Example 1 is reduced to 0.5 wt % to 1.5 wt %, it is apparent from the SEM results that the pores exist and the pores are uniformly distributed. In addition, when water droplets are dripped onto the surface of the ceramic membrane, the water droplets are easily absorbed by the ceramic membrane because of the pores that the ceramic membrane has. In this experiment, the rate at which water droplets are absorbed by the ceramic membrane is observed. It can be clearly seen that the water droplets can penetrate through into an inside of the ceramic membrane more efficiently when the concentrations of the solutions of Example 1 are 0.5 wt % and 1.0 wt %. That is, a better absorption rate can be achieved when the surface of the ceramic membrane is coated with PBz-ED-SB polymer solutions having concentrations of 0.5 wt % and 1.0 wt %. Hence, ceramic membranes coated with the PBz-ED-SB polymer solutions having the concentrations of 0.5 wt % and 1.0 wt % are selected for subsequent processing.

Figure 4:
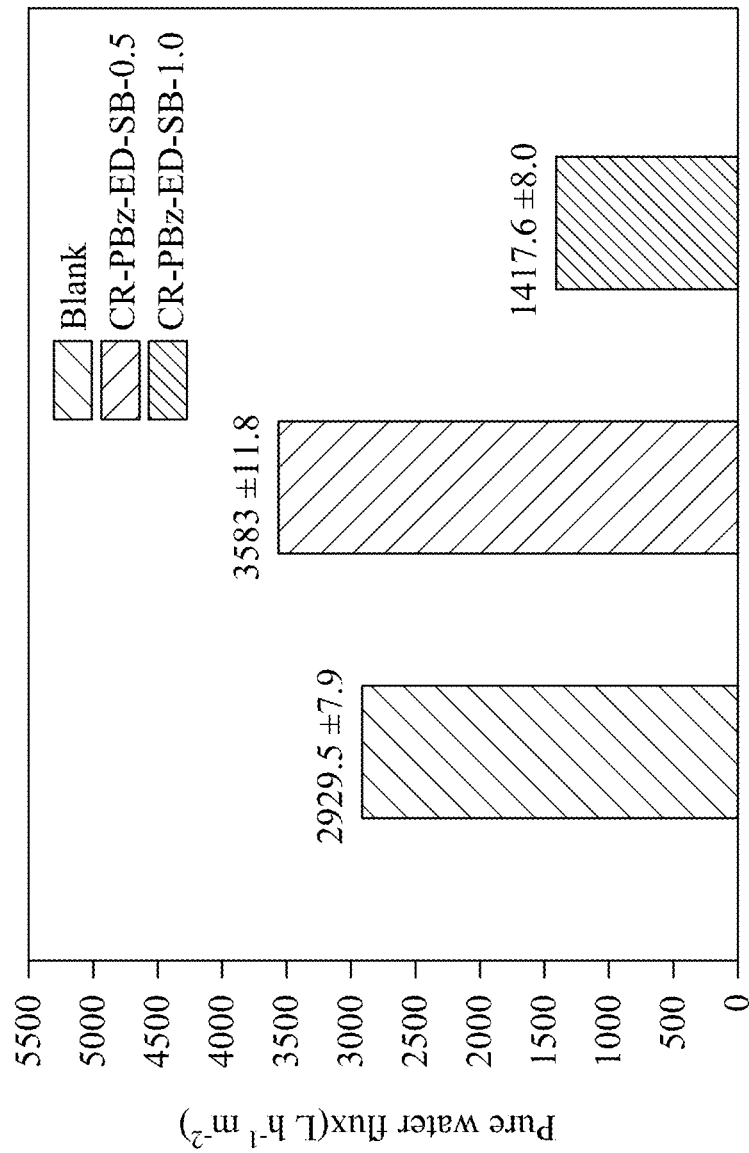
FIG. 4 shows experimental results of pure water flux by using ceramic membranes coated with solutions of a polymer with a zwitterionic group and a benzoxazine group having different concentrations on their surfaces according to one application example of this invention.

FIG. 4 shows experimental results of pure water flux by using ceramic membranes coated with solutions of Example 1 (PBz-ED-SB) having different concentrations on their surfaces according to one application example of this invention. As can be seen from the experimental results of FIG. 4, the pure water flux of the ceramic membrane (Blank) that is not coated with the polymer is about 2929.5 L $h^{-1}$ $m^{-2}$. The ceramic membrane coated with the solution of Example 1 at the concentration of 0.5 wt % has hydrophilic sulfobetaine groups on its surface, so its pure water flux value is increased to 3583.5 L $h^{-1}$ $m^{-2}$. The ceramic membrane coated with the solution of Example 1 at the concentration of 1.0 wt %, although it has hydrophilic groups on its surface, the experimental results show that its pure water flux value is significantly reduced to 1417.6 L $h^{-1}$ $m^{-2}$, which is about half the value of the ceramic membrane (Blank) that is not coated with the polymer. The possible cause of this situation is that the polymer concentration is excessively high to partially block the pores of the ceramic membrane, but this situation cannot be directly observed by SEM. Therefore, it can be illustrated from the experimental results that the ceramic membrane coated with PBz-ED-SB at the concentration of 0.5% is more suitable for use in pure water filtration than the ceramic membrane coated with PBz-ED-SB at the concentration of 1.0%.

Figure 5:
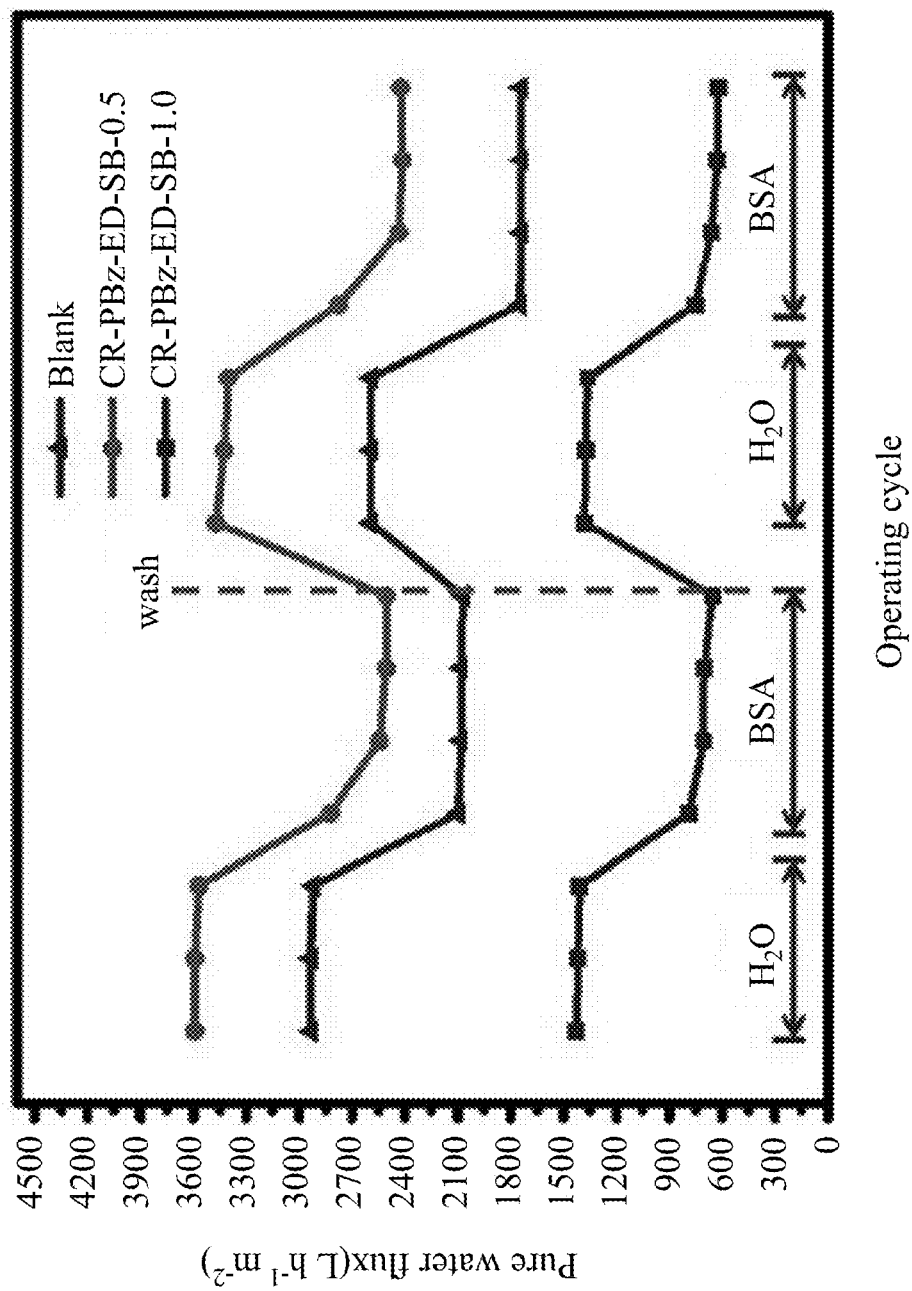
FIG. 5 shows experimental results of fluxes of pure water and bovine serum albumin aqueous solution by using ceramic membranes coated with solutions of a polymer with a zwitterionic group and a benzoxazine group having different concentrations on their surfaces according to one application example of this invention.

FIG. 5 shows experimental results of fluxes of pure water and bovine serum albumin (BSA) aqueous solution by using ceramic membranes coated with solutions of Example 1 (PBz-ED-SB) having different concentrations on their surfaces according to one application example of this invention. As can be seen from the experimental results of FIG. 5, the flux of the ceramic membrane (Blank) that is not coated with the polymer rapidly drops to about 2076 L $h^{-1}$ $m^{-2}$ from about 2929 L $h^{-1}$ $m^{-2}$ and maintains a stable flux value when the feed is changed from pure water to BSA aqueous solution. This situation illustrates that the ceramic membrane (Blank) not coated with the polymer is rapidly adsorbed by BSA molecules when the BSA aqueous solution is filtered, so that its pores are blocks. As a result, the flux rapidly decreases. After the ceramic membrane (Blank) that is not coated with the polymer is rinsed with deionized water, some of the BSA molecules adsorbed on the ceramic membrane can be removed, so its flux is restored to 2594 L $h^{-1}$ $m^{-2}$. At the same time, the value of its flux recovery ratio (FRR) can be calculated to be 88.5% and recorded in Table 3 as follows. When the feed is changed from pure water to BSA aqueous solution, the flux of the ceramic membrane (CR-PBz-ED-SB-0.5) coated with the solution of Example 1 at the concentration of 0.5 wt % first decreases from about 3584 L $h^{-1}$ $m^{-2}$ to about 2776 L $h^{-1}$ $m^{-2}$ slowly, and then tends to balance at 2518 L $h^{-1}$ $m^{-2}$ after several times of filtration by BSA aqueous solution. After the ceramic membrane coated with the solution of Example 1 at the concentration of 0.5 wt % is rinsed with deionized water, some of the BSA molecules adsorbed on the ceramic membrane can be removed, so its flux is restored to 3432 L $h^{-1}$ $m^{-2}$. At the same time, the value of its FRR can be calculated to be 95.8% and recorded in Table 3 as follows. Similarly, when the feed is changed from pure water to BSA aqueous solution, the ceramic membrane (CR-PBz-ED-SB-1.0) coated with the solution of Example 1 at the concentration of 1.0 wt % has similar results as those of the CR-PBz-ED-SB-0.5 ceramic membrane, and the value of its FRR is 96.8% and recorded in Table 3 as follows.

TABLE 3

| | FRR(%) | $R_t$(%) | $R_r$(%) | $R_{ir}$(%) |
|---|---|---|---|---|
| Ceramic membrane not coated with the polymer (Blank) | 88.5 | 29.1 | 17.7 | 11.44 |
| Ceramic membrane coated with the solution of Example 1 at the concentration of 0.5 wt % (CR-PBz-ED-SB-0.5) | 95.8 | 29.7 | 25.5 | 4.2 |
| Ceramic membrane coated with the solution of Example 1 at the concentration of 1.0 wt % (CR-PBz-ED-SB-1.0) | 96.8 | 51.5 | 48.3 | 3.2 |

From the values of FRRs in Table 3, it can be illustrated that the CR-PBz-ED-SB-0.5 ceramic membrane and the CR-PBz-ED-SB-1.0 ceramic membrane indeed have a better antifouling property than the ceramic membrane not coated with the solution of Example 1. It is noted that in Table 3, $R_t$ represents the total flux decline ratio, $R_r$ represents the reversible flux decline ratio, and $R_{ir}$ represents the irreversible flux decline ratio. It can be understood from the results of Table 3 that the ceramic membranes coated with the solution of the polymer of Example 1 according to the present invention has a better antifouling property.

Figure 6A:
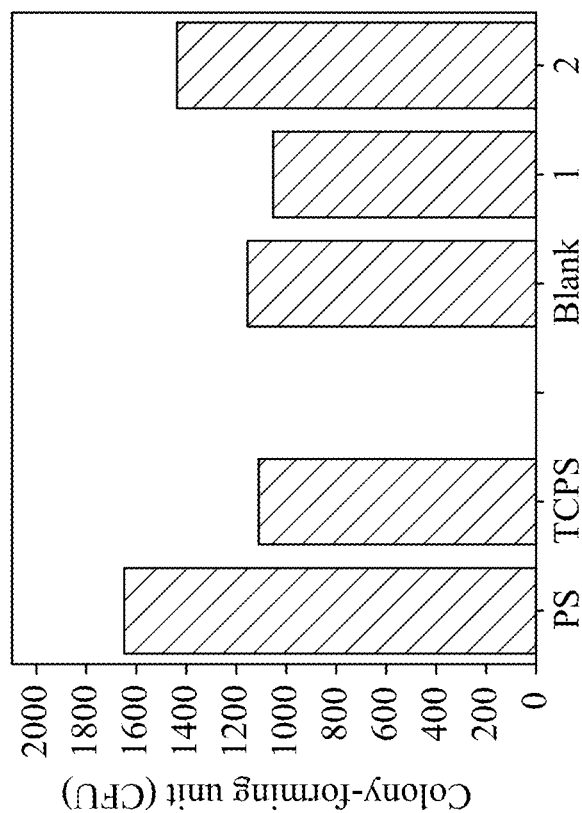
FIG. 6A and FIG. 6B show experimental results after ceramic membranes coated with a solution of a polymer with a zwitterionic group and a benzoxazine group on their surfaces are cultured respectively for 3 hours and 24 hours in an environment of *Escherichia coli* according to one application example of this invention.
Figure 6B:
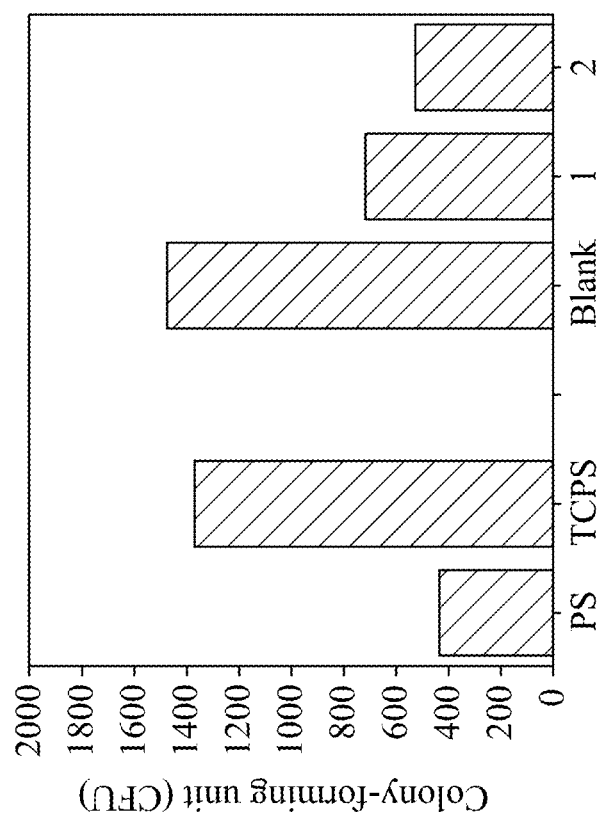

Application Example 2: Application of Zwitterionic Polymer PBz-ED-SB in Bacterial Adhesion FIG. 6A and FIG. 6B show experimental results after the CR-PBz-ED-SB-0.5 ceramic membranes are cultured respectively for 3 hours and 24 hours in an environment of *Escherichia coli* (*E. coli*) according to one application example of this invention. The experimental results in FIG. 6A illustrates that the number of *Escherichia coli* in the CR-PBz-ED-SB-0.5 ceramic membrane is about half that of the ceramic membrane (Blank) not coated with the polymer after 3 hours. However, the experimental results in FIG. 6B shows that there is no significant difference between the number of *E. coli* in the CR-PBz-ED-SB-0.5 ceramic membrane and the number of *E. coli* in the ceramic membrane (Blank) not coated with the polymer after 24 hours. The above results can illustrate that the CR-PBz-ED-SB-0.5 ceramic membrane is resistant to *E. coli* adhesion in a short period of time.

In summary, the present invention provides the polymer that contains the zwitterionic group and the benzoxazine group at the same time. Not only does it have the properties, performances, and applications of zwitterionics, but it also has the processing characteristics of benzoxazine polymers. For example, a material containing zwitterionic groups has good surface hydrophilicity, oil resistance, protein resistance, and antibacterial property. As for the applications, different zwitterionic groups are grafted onto surfaces of glass plates, and the surfaces of the glass plates have good anti-fog and anti-frost effects. In addition, the antifouling property of zwitterionic groups can be utilized so that good antifouling effects can be achieved in all the adsorption tests of protein, human red blood cell, and human white blood cell. For example, the physical properties and mechanical properties of the polymer containing the benzoxazine group exhibit the properties of a thermoplastic polymer during processing, and the material can be partially crosslinked or completely crosslinked by using a thermal curing treatment after the product has been processed to allow the material exhibits the typical advantages of a thermoplastic polymer.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A manufacturing method for a polymer with a zwitterionic group and a benzoxazine group comprising:
polymerizing a polymer containing the benzoxazine group and a precursor containing a Z functional group, wherein the Z functional group comprises

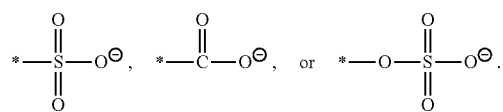

2. The manufacturing method of claim 1, wherein the polymer containing the benzoxazine group has a structure shown by the following formula (1):

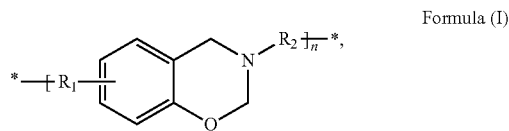

Formula (I)

wherein $R_1$ is an alkylene group, an unsaturated hydrocarbon group, an amine group, an amide group, a benzoxazine group, a siloxane group, a phenolic group, an aryl group, a heteroaromatic group, a heterocyclic group, a carbocyclic group, or a cycloalkane group, $R_2$ is an alkylene group, an unsaturated hydrocarbon group, an amine group, an amide group, a benzoxazine group, a siloxane group, a phenolic group, an aryl group, a heteroaromatic group, a heterocyclic group, a carbocyclic group, or a cycloalkane group, n is an integer.

3. The manufacturing method of claim 2, wherein the polymer containing the benzoxazine group is

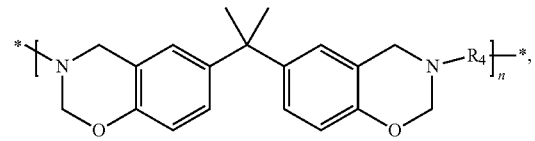

wherein $R_4$ is

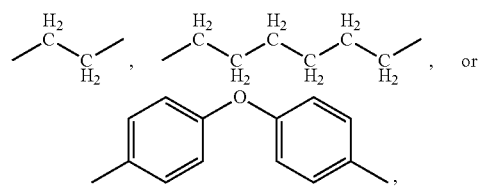

n is an integer.

4. The manufacturing method of claim 1, wherein the polymerizing is carried out at a temperature ranging from 35° C. to 80° C. under a nitrogen atmosphere.

5. The manufacturing method of claim 1, wherein the precursor containing the Z functional group comprises

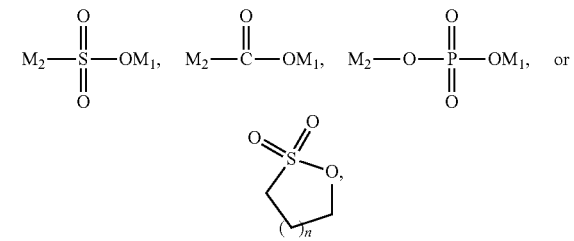

wherein $M_1$ comprises hydrogen, a metal cation, or an ammonium ion, $M_2$ comprises one of hydrocarbon groups having 1 to 10 carbon atoms, and n is one of hydrocarbon groups having 0 to 8 carbon atoms.

6. The manufacturing method of claim 5, wherein the precursor containing the Z functional group is 1,3-propane sultone.

7. The manufacturing method of claim 6, wherein the polymerizing comprises:
performing a ring-opening reaction on the 1,3-propane sultone; and
bonding the ring-opened 1,3-propane sultone to a nitrogen atom of the benzoxazine group of the polymer containing the benzoxazine group.

8. A polymer with a zwitterionic group and a benzoxazine group having a structure shown by the following formula (II):

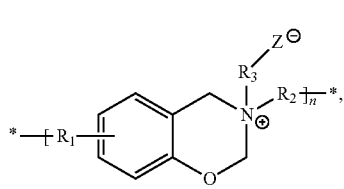

Formula (II)

wherein $R_1$ is an alkylene group, an unsaturated hydrocarbon group, an amine group, an amide group, a benzoxazine group, a siloxane group, a phenolic group, an aryl group, a heteroaromatic group, a heterocyclic group, a carbocyclic group, or a cycloalkane group, $R_2$ is an alkylene group, an unsaturated hydrocarbon group, an amine group, an amide group, a benzoxazine group, a siloxane group, a phenolic group, an aryl group, a heteroaromatic group, a heterocyclic group, a carbocyclic group, or a cycloalkane group, $R_3$ is an alkylene group, an alkenyl group, a cycloalkane group, an aryl group, or a heterocyclic group, $Z^-$ comprises

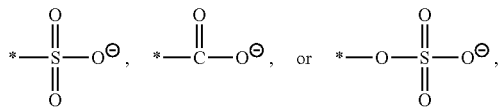

n is an integer.

9. The polymer with the zwitterionic group and the benzoxazine group of claim 8 having a structure shown by the following formula (III):

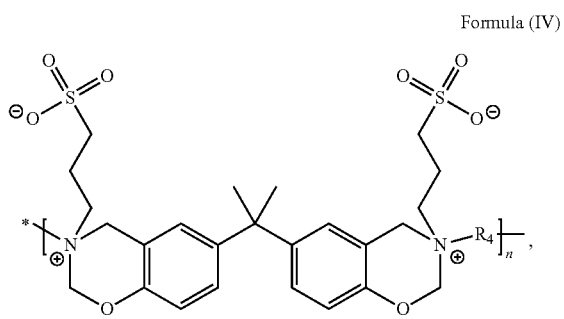

Formula (III)

wherein $R_4$ is

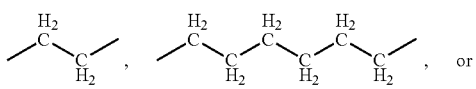

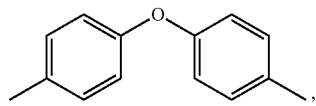

n is an integer.

10. The polymer with the zwitterionic group and the benzoxazine group of claim 8 having a structure shown by the following formula (IV):

Formula (IV)

wherein $R_4$ is

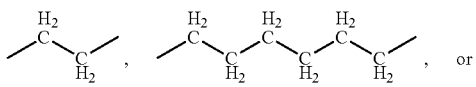

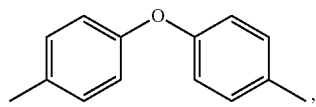

n is an integer.

* * * * *